United States Patent
Zhang et al.

(10) Patent No.: US 11,356,404 B2
(45) Date of Patent: Jun. 7, 2022

(54) DOMAIN NAME SYSTEM (DNS) OVERRIDE FOR EDGE COMPUTING

(71) Applicant: QUALCOMM Incorporated, San Diego, CA (US)

(72) Inventors: Juan Zhang, San Diego, CA (US); Ajith Tom Payyappilly, San Diego, CA (US); Tom Chin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/189,796

(22) Filed: Mar. 2, 2021

(65) Prior Publication Data

US 2021/0281537 A1    Sep. 9, 2021

Related U.S. Application Data

(60) Provisional application No. 62/985,160, filed on Mar. 4, 2020.

(51) Int. Cl.
*G06F 15/173* (2006.01)
*H04L 61/4511* (2022.01)

(52) U.S. Cl.
CPC ................ *H04L 61/1511* (2013.01)

(58) Field of Classification Search
CPC ................................. H04L 61/1511
See application file for complete search history.

(56) References Cited

U.S. PATENT DOCUMENTS 4,970,593 A * 11/1990 Cantrell ............... H04N 5/208
                                                                348/629
5,220,466 A *  6/1993 Coker .................. G11B 19/02
                                                                360/39

(Continued)

OTHER PUBLICATIONS

3rd Generation Partnership Project; Technical Specification Group Services and System Aspects; Study on enhancement of support for Edge Computing in 5G Core network (5GC) (Release 17), 3GPP Standard; Technical Report; 3GPP TR 23.748, 3RD Generation Partnership Project (3GPP), Mobile Competence Centre; 650, Route Des Lucioles; F-06921, Sophia-Antipolis Cedex; France, vol. SA WG2, No. V0.3.0, Feb. 3, 2020 (Feb. 3, 2020), pp. 1-40, XP051861023, Retrieved from the Internet: URL: http://ftp.3gpp.org/Specs/archive/23_series/23.748/23748-030.zip 23748-030_MCCclean.doc [retrieved on Feb. 3, 2020], clause 6.6.1.

(Continued)

*Primary Examiner* — Thanh T Nguyen
(74) *Attorney, Agent, or Firm* — Qualcomm Incorporated

(57) ABSTRACT

Certain aspects of the present disclosure provide techniques for a domain name system (DNS) override for edge computing. Embodiments include receiving signaling indicating an address of a DNS server. Embodiments include receiving signaling indicating an address of an edge DNS server. Embodiments include intercepting a DNS request from an application. Embodiments include changing a destination address of the DNS request to the address of the edge DNS server. Embodiments include intercepting a DNS response from the edge DNS server that is sent in response to the DNS request. Embodiments include upon determining that the DNS response does not comprise a failure notification, changing a source address of the DNS response to the address of the DNS server.

28 Claims, 7 Drawing Sheets

(56) References Cited

U.S. PATENT DOCUMENTS

| | | | | |
|---|---|---|---|---|
| 5,247,458 | A * | 9/1993 | Cabot | G06F 11/00 714/704 |
| 5,488,582 | A * | 1/1996 | Camarota | H03K 19/17752 365/189.05 |
| 5,513,123 | A * | 4/1996 | Dey | G06F 30/30 716/104 |
| 5,553,249 | A * | 9/1996 | Datwyler | G06F 13/4013 710/307 |
| 5,731,841 | A * | 3/1998 | Rosenbaum | H04N 5/21 348/463 |
| 5,933,594 | A * | 8/1999 | La Joie | G06F 11/277 714/26 |
| 6,011,501 | A * | 1/2000 | Gong | H03M 3/504 341/150 |
| 6,014,063 | A * | 1/2000 | Liu | H04B 15/04 327/157 |
| 6,111,710 | A * | 8/2000 | Feyh | G11B 20/10009 360/46 |
| 6,127,884 | A * | 10/2000 | Rishi | H04L 7/0334 329/304 |
| 6,367,003 | B1 * | 4/2002 | Davis | G06F 9/3001 712/208 |
| 6,609,977 | B1 * | 8/2003 | Shimizu | A63F 13/02 463/36 |
| 6,885,698 | B1 * | 4/2005 | Liaw | H04L 25/4927 375/220 |
| 6,898,281 | B1 * | 5/2005 | Larsson | H03H 17/0223 370/286 |
| 6,973,221 | B1 * | 12/2005 | Xue | H04N 19/176 375/E7.135 |
| 7,177,947 | B1 | 2/2007 | Herzog et al. | |
| 7,343,572 | B1 * | 3/2008 | Stone | G06F 30/33 716/106 |
| 7,623,721 | B1 * | 11/2009 | Pathak | H04N 1/4052 345/596 |
| 7,725,631 | B2 * | 5/2010 | Ogawa | G06F 11/1466 710/74 |
| 7,756,197 | B1 * | 7/2010 | Ferguson | H04L 1/24 375/224 |
| 8,289,195 | B1 * | 10/2012 | Dong | H03H 17/0685 341/61 |
| 9,233,797 | B2 * | 1/2016 | Herrmann | G01N 29/225 |
| 2002/0072879 | A1 * | 6/2002 | Sweitzer | H04L 25/4927 702/189 |
| 2002/0099966 | A1 * | 7/2002 | Cabler | H04L 12/12 713/323 |
| 2002/0126032 | A1 * | 9/2002 | Nanda | H03M 3/392 341/155 |
| 2002/0175705 | A1 * | 11/2002 | Lowy | H03K 3/0375 326/46 |
| 2002/0183952 | A1 * | 12/2002 | Poulsen | H04B 17/0085 702/117 |
| 2003/0012352 | A1 * | 1/2003 | Kiykioglu | H04M 15/56 379/114.01 |
| 2004/0075764 | A1 * | 4/2004 | Law | H04N 7/012 348/448 |
| 2004/0078103 | A1 * | 4/2004 | Marshall | G06F 11/142 700/87 |
| 2004/0139134 | A1 * | 7/2004 | Feather, Jr. | H04L 67/28 708/300 |
| 2004/0139195 | A1 * | 7/2004 | Feather, Jr. | H04L 43/00 709/224 |
| 2004/0139240 | A1 * | 7/2004 | DiCorpo | G06F 3/0683 710/3 |
| 2005/0036060 | A1 * | 2/2005 | Hatti | H04N 9/64 348/441 |
| 2005/0036065 | A1 * | 2/2005 | Hatti | H04N 7/012 348/453 |

OTHER PUBLICATIONS

International Search Report and Written Opinion—PCT/US2021/020740—ISA/EPO—dated Jun. 18, 2021.
ZTE: "Solution to KI#1: Discovery of Edge Application Server," 3GPP Draft, 3GPP TSG-SA/WG2 Meeting #136-AH, S2-2001715, 3RD Generation Partnership Project (3GPP), Mobile Competence Centre; 650, Route Des Lucioles; F-06921, Sophia-Antipolis Cedex; France, vol. SA WG2, No. Incheon, Korea, Jan. 13, 2020-Jan. 17, 2020, Jan. 27, 2020 (Jan. 27, 2020), XP051845613, 5 pages, Retrieved from the Internet: URL:https://ftp.3gpp.org/tsg_sa/WG2_Arch/TSGS2_136AH_Incheon/Docs/S2-2001715.zip S2-2001715_e-mail_rev4_S2-2001555.docx [retrieved-on Jan. 27, 2020] clause 6.X.2, steps 10 to 13.

* cited by examiner

US 11,356,404 B2

DOMAIN NAME SYSTEM (DNS) OVERRIDE FOR EDGE COMPUTING

CROSS-REFERENCE TO RELATED APPLICATION(S)

This application claims the benefit of and priority to U.S. Provisional Patent Application Ser. No. 62/985,160, filed Mar. 4, 2020, herein incorporated by reference in its entirety as if fully set forth below and for all applicable purposes.

INTRODUCTION

Field of the Disclosure

Aspects of the present disclosure relate to wireless communications, and more particularly, to techniques for overriding a DNS server for edge computing.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NB, next generation NodeB (gNB or gNodeB), transmission reception point (TRP), etc.). A BS or DU may communicate with a set of UEs on downlink channels (e.g., for transmissions from a BS or DU to a UE) and uplink channels (e.g., for transmissions from a UE to BS or DU).

These multiple access technologies have been adopted in various telecommunication standards to provide a common protocol that enables different wireless devices to communicate on a municipal, national, regional, and even global level. NR (e.g., new radio or 5G) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

In some cases, wireless networks, such as NR and LTE networks, may deploy edge computing devices, so named because they reside at an "edge" of the network. Edge computing devices may support dynamic distribution of processing of data and/or content between the edge computing devices and a wireless device, such as a UE.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication by a user equipment (UE). The method generally includes receiving signaling indicating an address of a domain name system (DNS) server. The method further includes receiving signaling indicating an address of an edge DNS server. The method further includes intercepting a DNS request from an application. The method further includes changing a destination address of the DNS request to the address of the edge DNS server. The method further includes intercepting a DNS response from the edge DNS server that is sent in response to the DNS request. The method further includes upon determining that the DNS response does not comprise a failure notification, changing a source address of the DNS response to the address of the DNS server.

Additional aspects provide a user equipment (UE) including a memory and a processor coupled to the memory. The memory and processor are configured to receive signaling indicating an address of a domain name system (DNS) server. The memory and processor are further configured to receive signaling indicating an address of an edge DNS server. The memory and processor are further configured to intercept a DNS request from an application. The memory and processor are further configured to change a destination address of the DNS request to the address of the edge DNS server. The memory and processor are further configured to intercept a DNS response from the edge DNS server that is sent in response to the DNS request. The memory and processor are further configured to, upon determining that the DNS response does not comprise a failure notification, change a source address of the DNS response to the address of the DNS server.

Additional aspects provide a user equipment (UE). The UE includes means for receiving signaling indicating an address of a domain name system (DNS) server. The UE further includes means for receiving signaling indicating an address of an edge DNS server. The UE further includes means for intercepting a DNS request from an application. The UE further includes means for changing a destination address of the DNS request to the address of the edge DNS server. The UE further includes means for intercepting a DNS response from the edge DNS server that is sent in response to the DNS request. The UE further includes means for, upon determining that the DNS response does not comprise a failure notification, changing a source address of the DNS response to the address of the DNS server.

Additional aspects provide a computer readable medium having instructions stored thereon, that when executed by at least one processor, cause the at least one processor to perform operations for wireless communication by a user equipment (UE). The operations generally includes receiving signaling indicating an address of a domain name system (DNS) server. The operations further includes receiving signaling indicating an address of an edge DNS server. The operations further includes intercepting a DNS request from an application. The operations further includes changing a destination address of the DNS request to the address of the edge DNS server. The operations further includes intercepting a DNS response from the edge DNS server that is sent in response to the DNS request. The operations further includes upon determining that the DNS response does not comprise a failure notification, changing a source address of the DNS response to the address of the DNS server.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

The following description and the appended figures set forth certain features for purposes of illustration.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
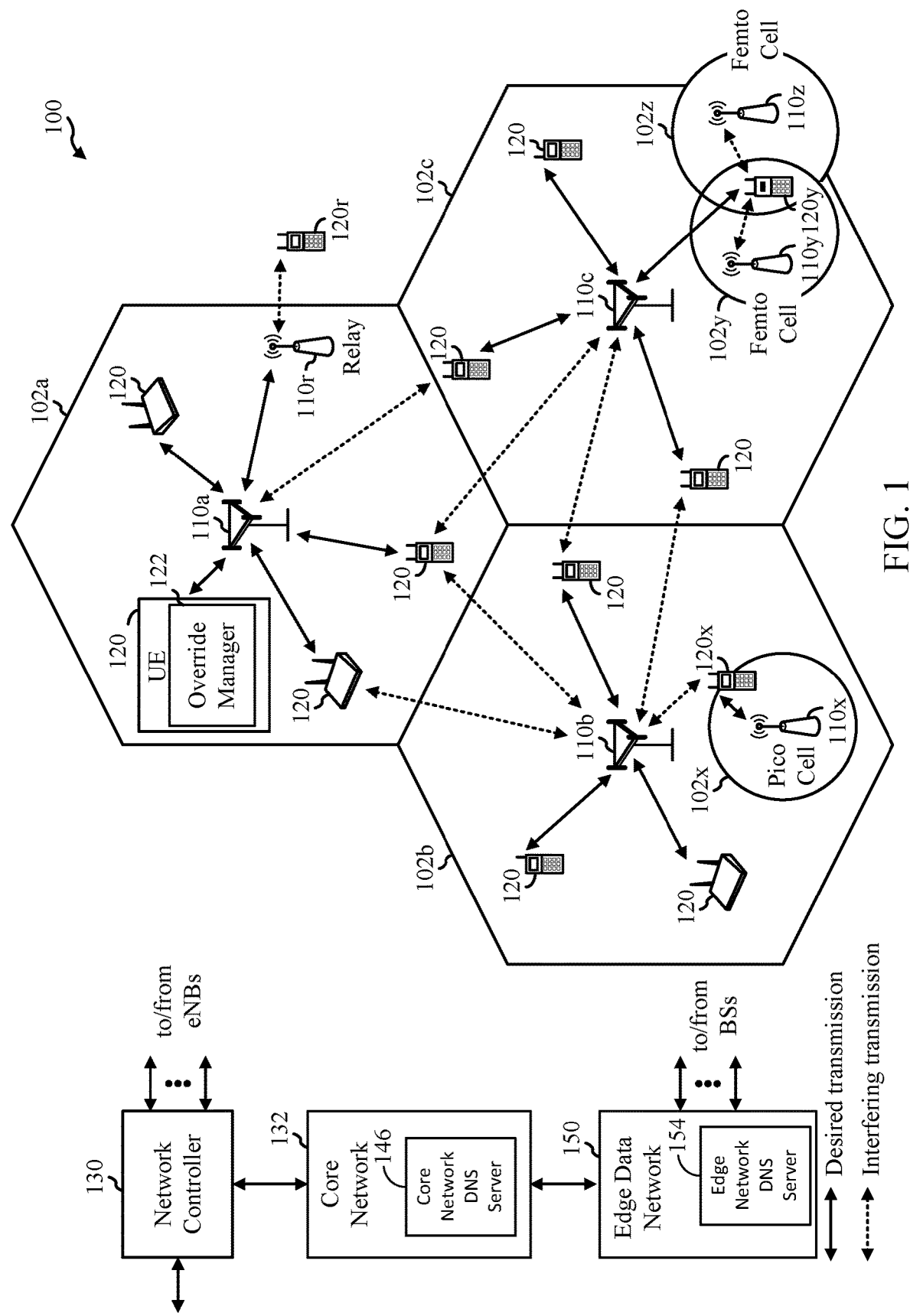
FIG. 1 is a block diagram conceptually illustrating an example telecommunications system, in accordance with certain aspects of the present disclosure.

Aspects of the present disclosure provide apparatus, methods, processing systems, and computer readable mediums for overriding domain name system (DNS) server addresses (e.g., internet protocol (IP) addresses for servers) for edge computing.

An edge computing device generally refers to a type of computing device, located at the edge of a wireless communications network (e.g., a device that is located in an edge network that provides prefetching, caching, processing, and/or serving of various content in order to reduce latency, and generally provides connectivity between devices in a network and devices outside the network). Edge computing devices may support dynamic distribution of processing of data and/or content between the edge computing devices and a wireless device, such as a UE. Processing the content on the edge computing devices may allow higher level processing than capable on a UE and can reduce strain on transmissions from the wireless communication network (e.g., by caching content at edge servers). Normally, applications on a UE use domain name system (DNS) requests to resolve domain names to IP addresses, and a core network DNS server would resolve a given domain name to an IP address of the original content server on the internet. A core network (e.g., a 5G Core Network (5GC)) provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc. A core network DNS server is a DNS server that resides in a core network and provides DNS resolution functionality for the core network, while an edge DNS server is located on the periphery of the network and reduces strain on the network by processing DNS requests related edge devices (e.g., edge content servers) from a local cache.

Techniques described herein involve overriding a destination IP address of a DNS request from an application to an address of an edge DNS server so that the domain name will be resolved to an IP address of an edge content server (e.g., a content server on the periphery of the network that caches content), and then overriding a source IP address of the response to the DNS request to an IP address of the core network DNS server so that the override is transparent to the application. The override of the destination IP address of the DNS request is transparent to the application because the application will believe that the core network DNS server performed the resolution of the domain name (based on the override of source IP address of the response) and will be unaware that the edge DNS server performed the resolution of the domain name. Conventionally, the core network DNS server would have resolved the domain name to a remote content sever, such as on the internet, but techniques described herein involve the edge DNS server resolving the domain to an edge content server and providing the IP address of the edge content server to the application so that the application will access the content from the edge content server rather than the remote content server.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 in which aspects of the present disclosure may be performed. For example, an override manager 122 in more or more of UEs 120 may be configured to perform operations 400 described below, to override DNS servers for edge computing. As described in greater detail below, edge computing devices (e.g., edge routers, edge gateways) may be deployed at the physical edge (or periphery) of the network 100 for processing content from a local cache. In aspects, each of UEs 120 may also include a similar or identical resource manager 122.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

Single carrier frequency division multiple access (SC-FDMA), which utilizes single carrier modulation and frequency domain equalization is a technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

FIG. 1 shows a wireless communication network 100 in which aspects of the present disclosure may be practiced. For example, evolved Node Bs 110 may cache content and transmit the cached content to user equipments (UEs) 120 as described herein.

Wireless communication network 100 may be an LTE network. The wireless network 100 may include a number of evolved Node Bs (eNBs) 110 and other network entities. An eNB may be a station that communicates with the UEs and may also be referred to as a base station, an access point, etc. A Node B is another example of a station that communicates with the UEs.

Each eNB 110 may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNB for a macro cell may be referred to as a macro eNB. An eNB for a pico cell may be referred to as a pico eNB. An eNB for a femto cell may be referred to as a femto eNB or a home eNB. In the example shown in FIG. 1, the eNBs 110a, 110b and 110c may be macro eNBs for the macro cells 102a, 102b and 102c, respectively. The eNB 110x may be a pico eNB for a pico cell 102x. The eNBs 110y and 110z may be femto eNBs for the femto cells 102y and 102z, respectively. An eNB may support one or multiple (e.g., three) cells.

The wireless network 100 may also include relay stations. A relay station is a station that receives a transmission of data and/or other information from an upstream station (e.g., an eNB or a UE) and sends a transmission of the data and/or other information to a downstream station (e.g., a UE or an eNB). A relay station may also be a UE that relays transmissions for other UEs. In the example shown in FIG. 1, a relay station 110r may communicate with the eNB 110a and a UE 120r in order to facilitate communication between the eNB 110a and the UE 120r. A relay station may also be referred to as a relay eNB, a relay, etc.

The wireless network 100 may be a heterogeneous network that includes eNBs of different types, e.g., macro eNBs, pico eNBs, femto eNBs, relays, etc. These different types of eNBs may have different transmit power levels, different coverage areas, and different impact on interference in the wireless network 100. For example, macro eNBs may have a high transmit power level (e.g., 20 Watts) whereas pico eNBs, femto eNBs and relays may have a lower transmit power level (e.g., 1 Watt).

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for both synchronous and asynchronous operation.

A network controller 130 may couple to a set of eNBs and provide coordination and control for these eNBs. The network controller 130 may communicate with the eNBs 110 via a backhaul. The eNBs 110 may also communicate with one another, e.g., directly or indirectly via wireless or wireline backhaul.

Network controller 130 may be in communication with a set of BSs 110 and provide coordination and control for the BSs 110 (e.g., via a fronthaul or backhaul link). In aspects, the network controller 130 may be in communication with a core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

An edge data network 150 may be in communication with one or more BSs 110 and/or the core network 132. The edge data network 150 may provide various edge services to the UEs 120 through the one or more BSs 110. In certain cases, the edge data network 150 may provide prefetching, caching, processing, and/or serving of various content sent to the UE 120. The edge data network 150 may reduce the latency at the UE and/or reduce the demand on backhaul links of the core network 132. As shown, core network 132 includes a core network DNS server 146, and edge data network 150 includes an edge network DNS server 154, each of which is discussed further herein, such as with respect to FIG. 3.

The UEs 120 may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, etc. A UE may be able to communicate with macro eNBs, pico eNBs, femto eNBs, relays, etc. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

The wireless network 100 may also include UEs 120 capable of communicating with a core network via one or more radio access networks (RANs) that implement one or more radio access technologies (RATs). For example, according to certain aspects provided herein, the wireless network 100 may include co-located access points (APs) and/or base stations that provide communication through a first RAN implementing a first RAT and a second RAN implementing a second RAT. According to certain aspects, the first RAN may be a wide area wireless access network (WWAN) and the second RAN may be a wireless local area network (WLAN). Examples of WWAN may include, but not be limited to, for example, radio access technologies (RATs) such as LTE, UMTS, cdma2000, GSM, and the like. Examples of WLAN may include, but not be limited to, for example, RATs such as Wi-Fi or IEEE 802.11 based technologies, and the like.

According to certain aspects provided herein, the wireless network 100 may include co-located Wi-Fi access points (APs) and femto eNBs that provide communication through Wi-Fi and cellular radio links. As used herein, the term "co-located" generally means "in close proximity to," and applies to Wi-Fi APs or femto eNBs within the same device enclosure or within separate devices that are in close proximity to each other. According to certain aspects of the present disclosure, as used herein, the term "femtoAP" may refer to a co-located Wi-Fi AP and femto eNB.

Figure 2:
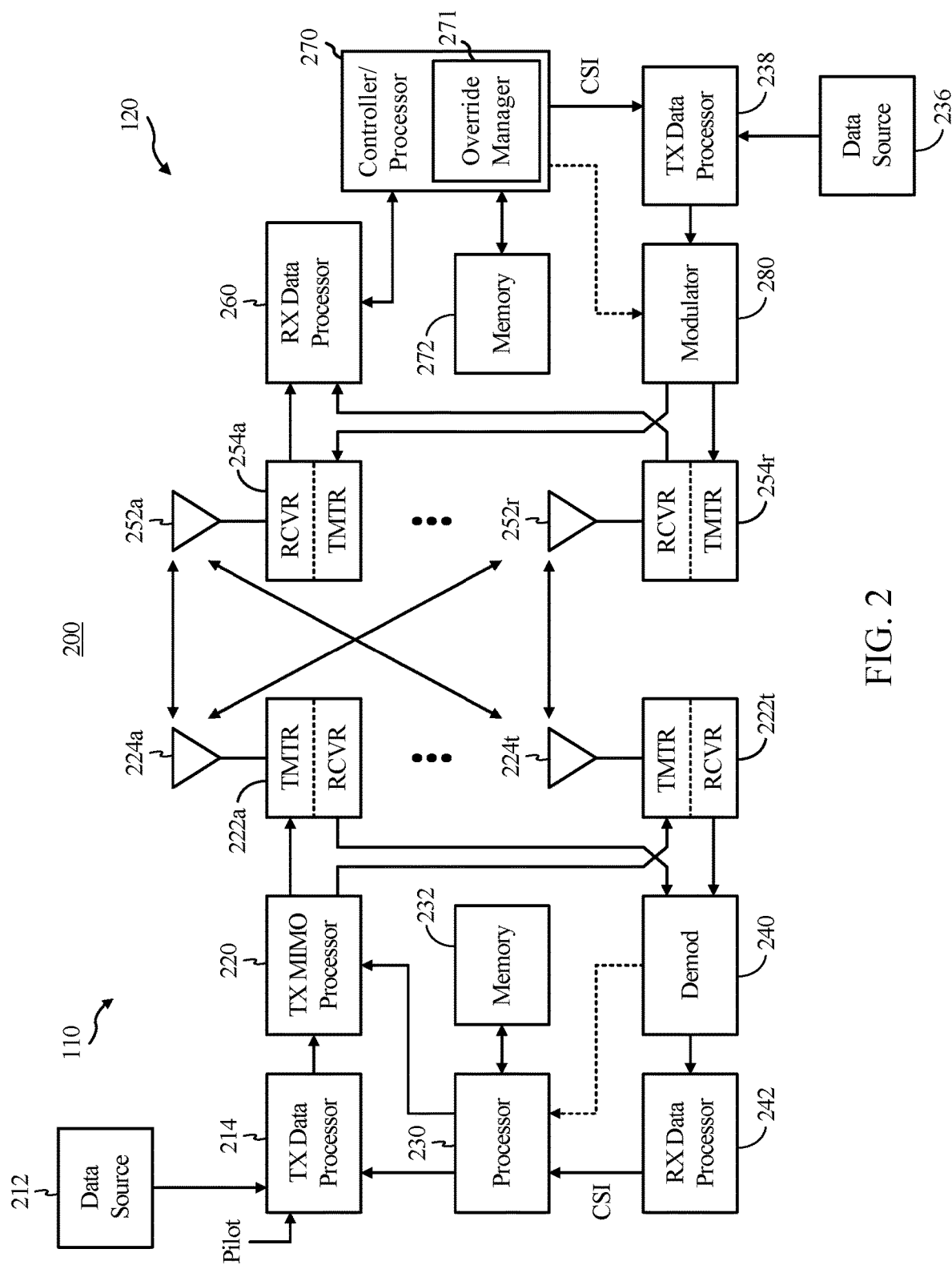
FIG. 2 is a block diagram conceptually illustrating a design of an example base station (BS) and user equipment (UE), in accordance with certain aspects of the present disclosure.

FIG. 2 is a block diagram of an example embodiment of a base station 110 (also known as an access point (AP)) and a UE 120 in which aspects of the present disclosure may be practiced. For example, the various processors of UE 120 may be configured to perform (or cause UE 120 to perform) operations 400 of FIG. 4. Similarly, the various processors of BS 110 may be configured to perform (or cause UE 120 to perform) other operations described herein.

At the base station 110, traffic data for a number of data streams is provided from a data source 212 to a transmit (TX) data processor 214. In an aspect, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides NT modulation symbol streams to NT transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At UE 120, the transmitted modulated signals are received by NR antennas 252a through 252r, and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at base station 110.

A processor 270 periodically determines which pre-coding matrix to use. Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to base station 110.

At base station 110, the modulated signals from UE 120 are received by antennas 224, conditioned by receivers 222, demodulated by a demodulator 240, and processed by a RX data processor 242 to extract the reserve link message transmitted by the UE 120. Processor 230 then determines which pre-coding matrix to use for determining the beamforming weights and then processes the extracted message.

According to certain aspects, the controllers/processors 230 and 270 may direct the operation at the base station 110 and the UE 120, respectively. As shown in FIG. 2, the controller/processor 270 of the UE 120 has an override manager 271 that performs operations described herein for overriding DNS servers for edge computing, such as operations 400 described below. Although shown at the controller/processor, other components of the UE 120 and BS 110 may be used to perform the operations described herein. According to an aspect, the processor 230, TX data processor 214, and/or other processors and modules at the base station 110 may perform or direct processes for the techniques described herein. According to another aspect, the processor 270, RX data processor 260, and/or other processors and modules at the UE 120 may perform or direct processes for the techniques described herein. For example, the processor 230, TX data processor 214, and/or other processors and modules at the base station 110 may perform or direct operations described herein, and/or other processors and modules at the UE 120 may perform or direct operations 400 of FIG. 4.

Figure 3:
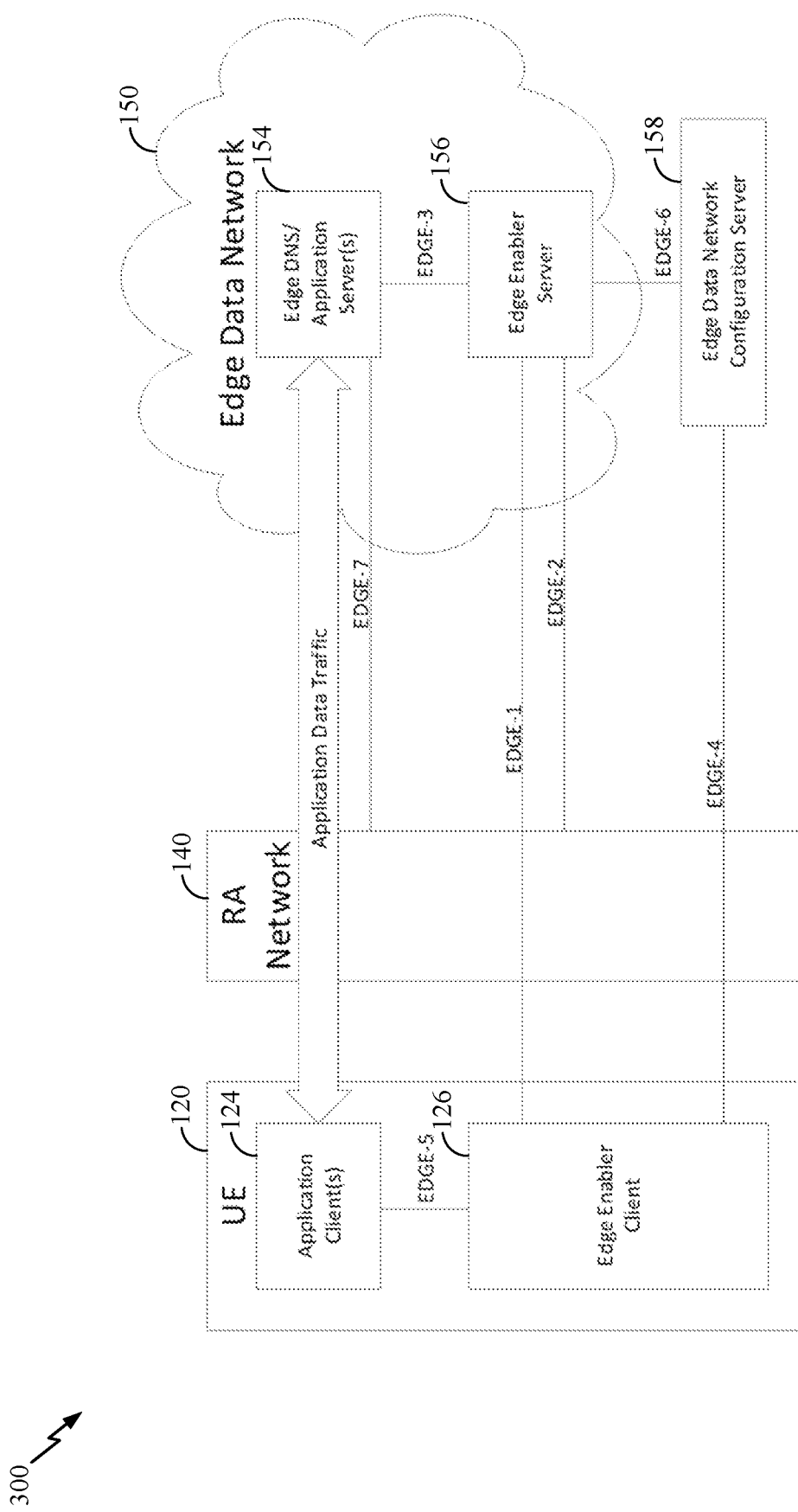
FIG. 3 illustrates an architecture for edge computing, in which certain aspects of the present disclosure may be practiced.

FIG. 3 illustrates an example wireless communication network 300 with an edge data network 150, in which aspects of the present disclosure may be practiced. In some cases, an edge enabler client 126 at a UE 120 may allow an application/client 124 (e.g., any application running on UE 120) to access edge computing services. The edge enabler client 126 may request certain information (such as area information for the edge data network 150) from the edge data network 150 via edge enabler server 156 to facilitate access to edge data network 150 by UE 120. In some cases, the application client 124 communicates with the edge enabler client 126 using an interface (e.g., shown as EDGE-5). Interfaces, such as EDGE-1, EDGE-2, and the like, generally comprise reference points that facilitate interactions with edge components, such as to register an edge enabler client to an edge enabler server, access network functions and APIs for retrieval of network capability information, and the like. On the network edge, the edge data network 150 may include various network entities including one or more edge DNS servers 154, edge application servers 154, an edge enabler server 156 and, in some cases, an edge data network configuration server 158. In some cases, the UE 120 communicates with the edge data network 150 using one or more interfaces (e.g., EDGE-1 and EDGE-4) and/or via the radio access network (RAN) 140 (e.g., including one or more BSs 110), while the RAN 140 communicates with the edge data network 150 via its own interface (e.g., EDGE-2 and EDGE-7). In certain aspects, a local DNS server may be integrated into the edge data network 150 (e.g., an edge DNS server 154), such that the edge data network 150 supports its own DNS resolution for edge applications or services. In certain aspects, the RAN 140 may include various radio access network entities such as one or more BSs 110. In aspects, the RAN network 140 may also communicate with the core network 132 (e.g., via the edge network 150 as shown in FIG. 1). In aspects, the network controller 130 and/or the core network 132 may include a central DNS server (e.g., core network DNS server 146) that provides DNS resolution across a wireless network, as shown in FIG. 1.

Example DNS Override for Edge Computing

Certain implementations described herein relate to overriding edge server addresses for edge computing.

Local caching may be utilized in various edge data network deployments, such as mobile content delivery networks (CDNs), multi-access edge computing (MEC). In general, local caching is designed to push/pull desired content (e.g., media of various types) to the edge devices closest to the requesting users. In some cases, a local cache is physically close to or inside of an edge device. Local caching reduces the traffic load on the backhaul links and speed up access times for the requesting users. A network may cache content close to an edge router (e.g., a packet gateway (PGW) in an LTE system, a user plane function (UPF) in a 5G or NR system, or a gateway general packet radio service (GPRS) support node (GGSN) in a 3G or universal mobile telecommunications service (UMTS) network) of one or more UEs. In some cases, a base station of a wireless communications system may cache certain content locally for reducing latency. Prefetching, caching, processing, and/or serving data at edge devices, may also reduce overall demand on the backhaul links and help limit signaling and user traffic to and/or from core networks.

Conventionally, applications running on a UE utilize DNS to resolve domain names to IP addresses of content servers, which may be located remotely, such as over the internet.

A modem of a UE receives an address (e.g., IP address) of a core network DNS server as part of a protocol data unit (PDU) session setup via non-access strata (NAS) signaling. The modem uses the core network DNS server for system applications running on the modem (e.g., IP multimedia subsystem (IMS), global positioning system (GPS), etc.) by sending DNS requests related to these system applications to the core network DNS server. Furthermore, the modem provides the core network DNS server address to a high-level operating system (HLOS), which uses the address when applications running on the HLOS call application programming interface (API) methods to resolve domain names to IP addresses. Applications, which are generally unaware of edge computing devices, will send a DNS request to the core network DNS server, which resolves a domain name in the DNS request to an (e.g., IP) address of the original content server on the internet. As such, these applications will not conventionally receive the benefits provided by an edge DNS server, such as resolving domain names to IP addresses of edge content servers that serve cached content rather than remote content servers over the internet. Techniques described herein address this problem through a DNS overriding process, as described in more detail below with respect to FIG. 4.

Figure 4:
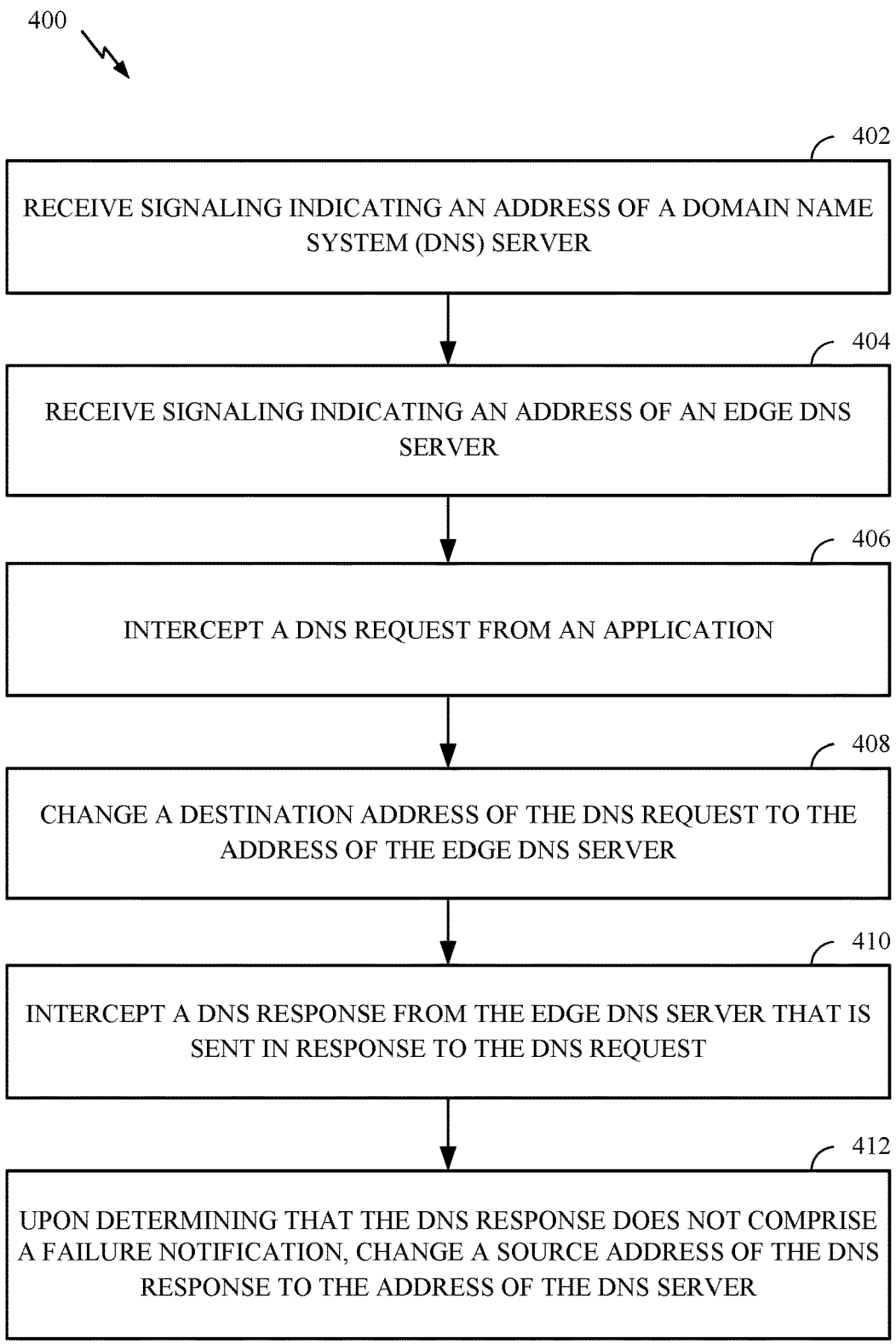
FIG. 4 illustrates example operations for wireless communications by a user equipment (UE), in accordance with some aspects of the present disclosure.

FIG. 4 illustrates example operations for wireless communications by a user equipment (UE), in accordance with some aspects of the present disclosure. Operations 400 may be performed, for example, by a UE (e.g., such as a UE 120 in the wireless communication network 100).

Operations 400 begin at 402, with receiving signaling indicating an address of a domain name system (DNS) server.

Operations 400 continue at 404, with receiving signaling indicating an address of an edge DNS server.

Operations 400 continue at 406, with intercepting a DNS request from an application.

Operations 400 continue at 408, with changing a destination address of the DNS request to the address of the edge DNS server.

Operations 400 continue at 410, with intercepting a DNS response from the edge DNS server that is sent in response to the DNS request.

Operations 400 continue at 412, upon determining that the DNS response does not comprise a failure notification, with changing a source address of the DNS response to the address of the DNS server.

An edge client residing on a modem of the UE communicates with an edge server and receives an address of the edge DNS server that the edge network wants applications to use while in the domain of the edge server. The modem stores the edge DNS server address received from the edge server as well as the address of the core network DNS server received via NAS signaling as part of the UDP process. The modem further establishes filters on the data path to intercept DNS packets to and from the HLOS and core network DNS server.

On the uplink (UL), the modem modifies a destination IP address of a DNS request sent by an application from the address of the core network DNS server to the address of the edge DNS server. On the downlink (DL), the modem modifies a source IP address of a DNS response from the edge DNS server to be the address of the core network DNS server. As such, the application and HLOS believe they are communicating with the core network DNS server, but in fact they are communicating with the edge DNS server, which resolves DNS requests to the edge network's content servers. It is noted that while certain embodiments are described with respect to edge servers, techniques described herein may also be employed with traffic directed to other types of servers.

Figure 5:
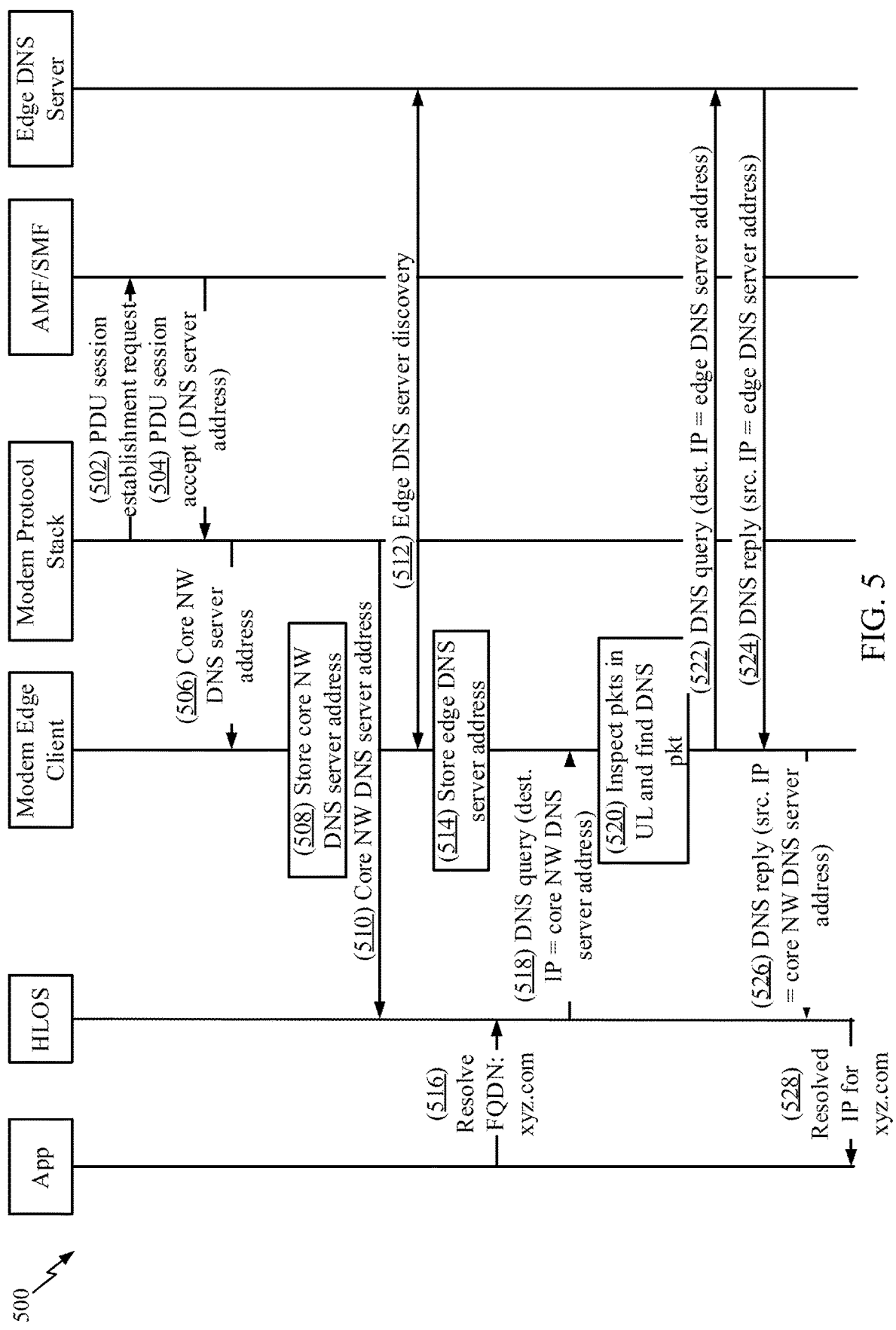
FIG. 5 illustrates an example call flow for DNS override for edge computing.

FIG. 5 illustrates a call flow 500 for DNS override for edge computing.

In call flow 500, at 502, a modem protocol stack of a UE sends a PDU session establishment request to an AMF/SMF of a core network, and, at 504, receives a PDU sessions acceptance from the AMF/SMF, including an address of a core network DNS server. At 506, the modem protocol stack sends the core network DNS server address to a modem edge client, which stores the core network DNS server address at 508. The modem protocol stack also sends the core network DNS server address to a HLOS of the UE at 510.

The modem edge client performs an edge DNS server discovery process at 512, such as through communication with an edge server of an edge network, to receive an address of an edge DNS server. The modem edge client stores the address of the edge DNS server at 514.

At 516, an app running on the UE sends a DNS request to resolve a fully qualified domain name (FQDN), xyz.com, to the HLOS, which issues a DNS query to resolve the domain name at 518. The DNS query send by the HLOS has a destination IP address that is set to the address of the core network DNS server.

At 520, the modem edge client inspects packets (e.g., using filters), and intercepts the DNS query sent by the HLOS. The modem edge client then modifies the destination address of the DNS query from the address of the core network DNS server to the address of the edge DNS server. As such, the DNS query is submitted to the edge DNS server at 522.

The edge DNS server responds to the DNS query with a DNS reply at 524. The source IP address of the DNS reply is the address of the edge DNS server. The modem edge client intercepts the DNS reply and modifies the source IP address of the DNS reply from the address of the edge DNS server to the address of the core network DNS server. As such, the DNS reply is received by the HLOS with a source IP address indicating the address of the core network DNS server at 526. The HLOS sends a resolved IP address for xyz.com (e.g., included in the DNS reply) to the app at 528. Accordingly, the app receives the IP address of a content server on the edge network as a resolution of the domain name without being aware of the edge DNS server. The app subsequently submits requests for content to the IP address of the content server on the edge network.

While call flow 500 illustrates a success case, there may be cases in which the edge DNS server is unable to respond to the DNS query. As described in more detail below with respect to FIG. 6, a failure case may be handled by re-sending the DNS query to the core network DNS server.

Figure 6:
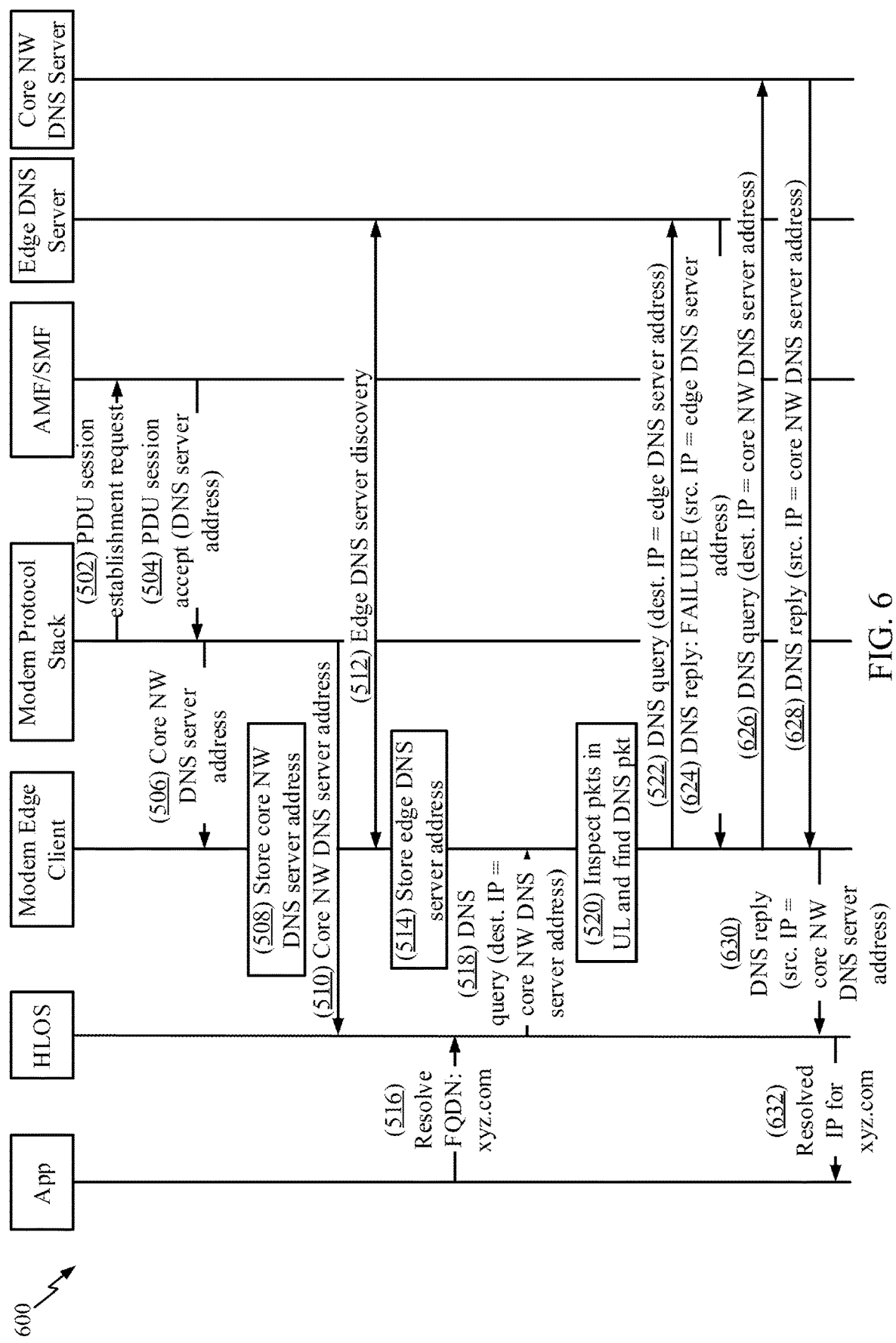
FIG. 6 illustrates another example call flow for DNS override for edge computing.

FIG. 6 illustrates an additional call flow for DNS override for edge computing. Call flow 600 includes the operations described above with respect to call flow 500 of FIG. 5, except the DNS reply from the edge DNS server comprises a failure notification at 624. For example, the edge DNS server may be unable to resolve the domain name because the edge network may not have a content server with cached content for the domain name. In response to detecting the failure, the modem edge client re-sends the original DNS query to the core network DNS server (e.g., by setting the destination IP address of the DNS query back to the address of the core network DNS server) at 626.

The core network DNS server responds to the DNS query with a DNS reply at 628 that includes the IP address of a content server (e.g., a remote content server) and has a source IP address of the core network DNS server. The modem edge client does not modify the source IP address of the DNS reply, because it already has the address of the core network DNS server as its source IP address. The HLOS receives the DNS reply at 630 and provides the resolved IP address for xyz.com (e.g., resolved to the IP address of the remote content server) to the app at 632.

In certain embodiments, the edge DNS server indicates, in the failure notification, an address of a DNS server to which the DNS request should be sent (e.g., which may be the address of the core network DNS server or another DNS server). In this case, the modem edge client then resends the DNS query to the address indicated in the DNS reply. If the address is not the address of the core network DNS server, then the modem edge client modifies a source IP address of the DNS reply to be the IP address of the core network DNS server.

Figure 7:
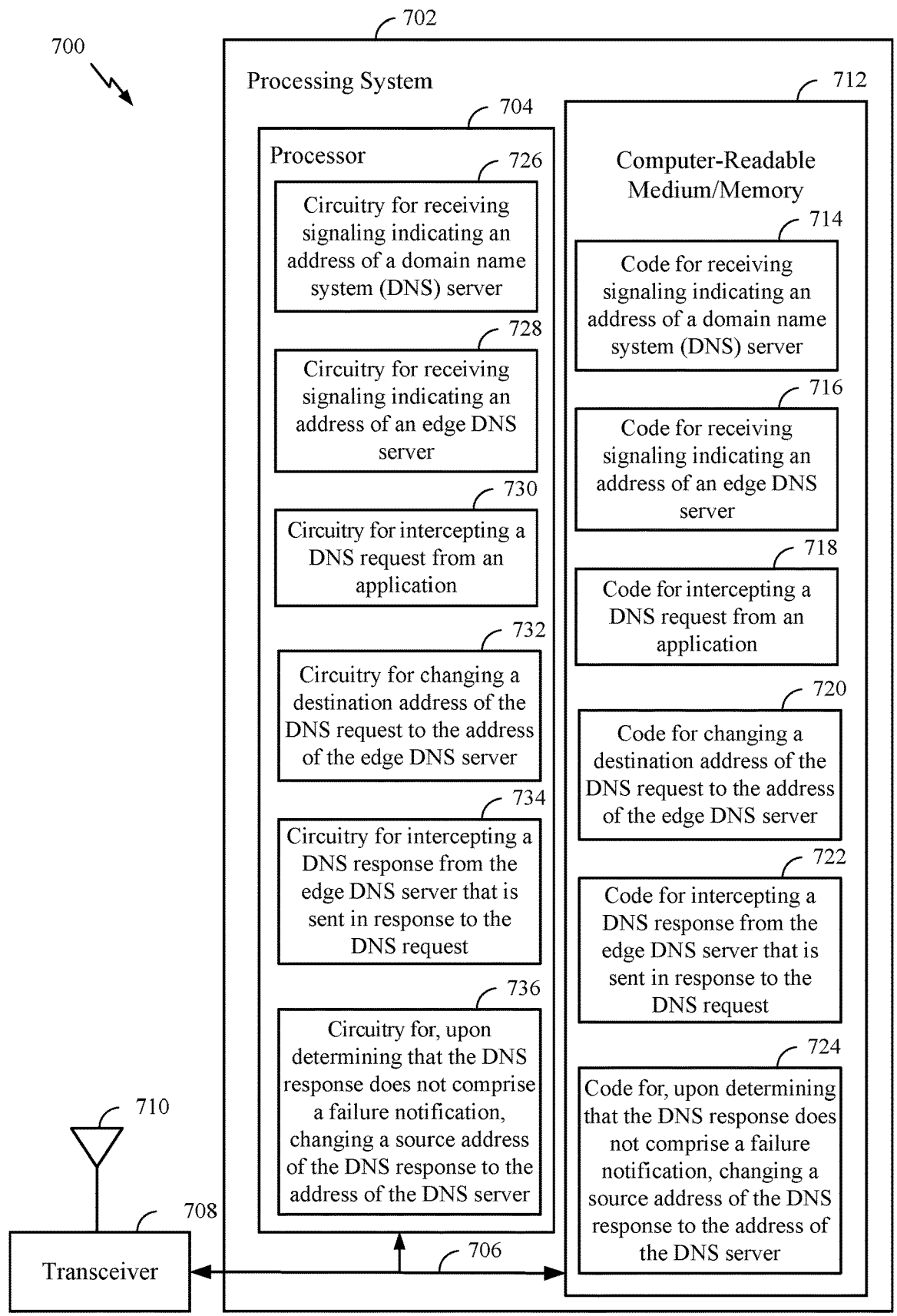
FIG. 7 illustrates a communications device that may include various components configured to perform operations for the techniques disclosed herein in accordance with aspects of the present disclosure.

FIG. 7 illustrates a communications device 700 that may include various components (e.g., corresponding to means-plus-function components) configured to perform operations for the techniques disclosed herein, such as the operations illustrated in FIG. 4. The communications device 700 includes a processing system 702 coupled to a transceiver 708. The transceiver 708 is configured to transmit and receive signals for the communications device 700 via an antenna 710, such as the various signals as described herein. The processing system 702 may be configured to perform processing functions for the communications device 700, including processing signals received and/or to be transmitted by the communications device 700.

The processing system 702 includes a processor 704 coupled to a computer-readable medium/memory 712 via a bus 706. In certain aspects, the computer-readable medium/memory 712 is configured to store instructions (e.g., computer-executable code) that when executed by the processor 704, cause the processor 704 to perform the operations illustrated in FIG. 4, or other operations for performing the various techniques discussed herein for resolving temporal conflicts for use of system-wide feedback resources between scheduled feedback transmissions and scheduled feedback receptions that overlap in time. In certain aspects, computer-readable medium/memory 712 stores code 714 for receiving signaling indicating an address of a domain name system (DNS) server; code 716 for receiving signaling indicating an address of an edge DNS server; code 718 for intercepting a DNS request from an application; code 720 for changing a destination address of the DNS request to the address of the edge DNS server; code 722 for intercepting a DNS response from the edge DNS server that is sent in response to the DNS request; and code 724 for, upon determining that the DNS response does not comprise a failure notification, changing a source address of the DNS response to the address of the DNS server. In certain aspects, the processor 704 has circuitry configured to implement the code stored in the computer-readable medium/memory 712. The processor 704 includes circuitry 726 for receiving signaling indicating an address of a domain name system (DNS) server; circuitry 728 for receiving signaling indicating an address of an edge DNS server; circuitry 730 for intercepting a DNS request from an application; circuitry 732 for changing a destination address of the DNS request to the address of the edge DNS server; circuitry 734 for intercepting a DNS response from the edge DNS server that is sent in response to the DNS request; and circuitry 736 for, upon determining that the DNS response does not comprise a failure notification, changing a source address of the DNS response to the address of the DNS server.

Example Clauses

Implementation examples are described in the following numbered clauses:

Clause 1: A method for wireless communication by a user equipment (UE), comprising: receiving signaling indicating an address of a domain name system (DNS) server; receiving signaling indicating an address of an edge DNS server; intercepting a DNS request from an application; changing a destination address of the DNS request to the address of the edge DNS server; intercepting a DNS response from the edge DNS server that is sent in response to the DNS request; and upon determining that the DNS response does not comprise a failure notification, changing a source address of the DNS response to the address of the DNS server.

Clause 2: The method of Clause 1, further comprising, upon determining that the DNS response comprises a failure notification, re-sending the DNS request to the address of the DNS server.

Clause 3: The method of any of Clause 1-2, further comprising, upon determining that the DNS response comprises a failure notification, re-sending the DNS request to an address indicated in the DNS response.

Clause 4: The method of any of Clause 1-3, wherein the signaling indicating the address of the DNS server is received in response to a protocol data unit (PDU) session establishment request.

Clause 5: The method of any of Clause 1-4, wherein the DNS response comprises a resolved internet protocol (IP) address for a domain name specified in the DNS request.

Clause 6: The method of any of Clause 1-5, further comprising establishing a filter on a data path in order to intercept DNS requests and DNS responses.

Clause 7: The method of any of Clause 1-6, further comprising requesting content from a content server indicated in the DNS response.

Clause 8: A user equipment (UE), comprising: a memory; and a processor coupled to the memory, the memory and processor configured to: receive signaling indicating an address of a domain name system (DNS) server; receive signaling indicating an address of an edge DNS server; intercept a DNS request from an application; change a destination address of the DNS request to the address of the edge DNS server; intercept a DNS response from the edge DNS server that is sent in response to the DNS request; and upon determining that the DNS response does not comprise a failure notification, change a source address of the DNS response to the address of the DNS server.

Clause 9: The UE of Clause 8, wherein the memory and processor are further configured to, upon determining that the DNS response comprises a failure notification, re-send the DNS request to the address of the DNS server.

Clause 10: The UE of any of Clause 8-9, wherein the memory and processor are further configured to, upon determining that the DNS response comprises a failure notification, re-send the DNS request to an address indicated in the DNS response.

Clause 11: The UE of any of Clause 8-10, wherein the signaling indicating the address of the DNS server is received in response to a protocol data unit (PDU) session establishment request.

Clause 12: The UE of any of Clause 8-11, wherein the DNS response comprises a resolved internet protocol (IP) address for a domain name specified in the DNS request.

Clause 13: The UE of any of Clause 8-12, wherein the memory and processor are further configured to establish a filter on a data path in order to intercept DNS requests and DNS responses.

Clause 14: The UE of any of Clause 8-13, wherein the memory and processor are further configured to request content from a content server indicated in the DNS response.

Clause 15: A user equipment (UE), comprising: means for receiving signaling indicating an address of a domain name system (DNS) server; means for receiving signaling indicating an address of an edge DNS server; means for intercepting a DNS request from an application; means for changing a destination address of the DNS request to the address of the edge DNS server; means for intercepting a DNS response from the edge DNS server that is sent in response to the DNS request; and means for, upon determining that the DNS response does not comprise a failure notification, changing a source address of the DNS response to the address of the DNS server.

Clause 16: The UE of Clause 15, further comprising means for, upon determining that the DNS response comprises a failure notification, re-sending the DNS request to the address of the DNS server.

Clause 17: The UE of any of Clause 15-16, further comprising means for, upon determining that the DNS response comprises a failure notification, re-sending the DNS request to an address indicated in the DNS response.

Clause 18: The UE of any of Clause 15-17, wherein the signaling indicating the address of the DNS server is received in response to a protocol data unit (PDU) session establishment request.

Clause 19: The UE of any of Clause 15-18, wherein the DNS response comprises a resolved internet protocol (IP) address for a domain name specified in the DNS request.

Clause 20: The UE of any of Clause 15-19, further comprising means for establishing a filter on a data path in order to intercept DNS requests and DNS responses.

Clause 21: The UE of any of Clause 15-20, further comprising means for requesting content from a content server indicated in the DNS response.

Clause 22: A computer readable medium having instructions stored thereon for: receiving signaling indicating an address of a domain name system (DNS) server; receiving signaling indicating an address of an edge DNS server; intercepting a DNS request from an application; changing a destination address of the DNS request to the address of the edge DNS server; intercepting a DNS response from the edge DNS server that is sent in response to the DNS request; and, upon determining that the DNS response does not comprise a failure notification, changing a source address of the DNS response to the address of the DNS server.

Clause 23: The computer readable medium of Clause 22, further comprising instructions for, upon determining that the DNS response comprises a failure notification, re-sending the DNS request to the address of the DNS server.

Clause 24: The computer readable medium of any of Clause 22-23, further comprising instructions for, upon determining that the DNS response comprises a failure notification, re-sending the DNS request to an address indicated in the DNS response.

Clause 25: The computer readable medium of any of Clause 22-24, wherein the signaling indicating the address of the DNS server is received in response to a protocol data unit (PDU) session establishment request.

Clause 26: The computer readable medium of any of Clause 22-25, wherein the DNS response comprises a resolved internet protocol (IP) address for a domain name specified in the DNS request.

Clause 27: The computer readable medium of any of Clause 22-26, further comprising instructions for establishing a filter on a data path in order to intercept DNS requests and DNS responses.

Clause 28: The computer readable medium of any of Clause 22-27, further comprising instructions for requesting content from a content server indicated in the DNS response.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIG. 4.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:
1. A user equipment (UE), comprising:
a memory; and
a processor coupled to the memory, the memory and processor configured to:
receive signaling indicating an address of a domain name system (DNS) server;
receive signaling indicating an address of an edge DNS server;
intercept a DNS request from an application;
change a destination address of the DNS request to the address of the edge DNS server;

intercept a DNS response from the edge DNS server that is sent in response to the DNS request; and upon determining that the DNS response does not comprise a failure notification, change a source address of the DNS response to the address of the DNS server.

2. The UE of claim 1, wherein the memory and processor are further configured to, upon determining that the DNS response comprises a failure notification, re-send the DNS request to the address of the DNS server.

3. The UE of claim 1, wherein the memory and processor are further configured to, upon determining that the DNS response comprises a failure notification, re-send the DNS request to an address indicated in the DNS response.

4. The UE of claim 1, wherein the signaling indicating the address of the DNS server is received in response to a protocol data unit (PDU) session establishment request.

5. The UE of claim 1, wherein the DNS response comprises a resolved internet protocol (IP) address for a domain name specified in the DNS request.

6. The UE of claim 1, wherein the memory and processor are further configured to establish a filter on a data path in order to intercept DNS requests and DNS responses.

7. The UE of claim 1, wherein the memory and processor are further configured to request content from a content server indicated in the DNS response.

8. A method for wireless communication by a user equipment (UE), comprising:

receiving signaling indicating an address of a domain name system (DNS) server;

receiving signaling indicating an address of an edge DNS server;

intercepting a DNS request from an application;

changing a destination address of the DNS request to the address of the edge DNS server;

intercepting a DNS response from the edge DNS server that is sent in response to the DNS request; and upon determining that the DNS response does not comprise a failure notification, changing a source address of the DNS response to the address of the DNS server.

9. The method of claim 8, further comprising, upon determining that the DNS response comprises a failure notification, re-sending the DNS request to the address of the DNS server.

10. The method of claim 8, further comprising, upon determining that the DNS response comprises a failure notification, re-sending the DNS request to an address indicated in the DNS response.

11. The method of claim 8, wherein the signaling indicating the address of the DNS server is received in response to a protocol data unit (PDU) session establishment request.

12. The method of claim 8, wherein the DNS response comprises a resolved internet protocol (IP) address for a domain name specified in the DNS request.

13. The method of claim 8, further comprising establishing a filter on a data path in order to intercept DNS requests and DNS responses.

14. The method of claim 8, further comprising requesting content from a content server indicated in the DNS response.

15. A user equipment (UE), comprising:

means for receiving signaling indicating an address of a domain name system (DNS) server;

means for receiving signaling indicating an address of an edge DNS server;

means for intercepting a DNS request from an application;

means for changing a destination address of the DNS request to the address of the edge DNS server;

means for intercepting a DNS response from the edge DNS server that is sent in response to the DNS request; and means for, upon determining that the DNS response does not comprise a failure notification, changing a source address of the DNS response to the address of the DNS server.

16. The UE of claim 15, further comprising means for, upon determining that the DNS response comprises a failure notification, re-sending the DNS request to the address of the DNS server.

17. The UE of claim 15, further comprising means for, upon determining that the DNS response comprises a failure notification, re-sending the DNS request to an address indicated in the DNS response.

18. The UE of claim 15, wherein the signaling indicating the address of the DNS server is received in response to a protocol data unit (PDU) session establishment request.

19. The UE of claim 15, wherein the DNS response comprises a resolved internet protocol (IP) address for a domain name specified in the DNS request.

20. The UE of claim 15, further comprising means for establishing a filter on a data path in order to intercept DNS requests and DNS responses.

21. The UE of claim 15, further comprising means for requesting content from a content server indicated in the DNS response.

22. A computer readable medium having instructions stored thereon, that when executed by at least one processor, cause the at least one processor to perform operations for wireless communication by a user equipment (UE), the operations comprising:

receiving signaling indicating an address of a domain name system (DNS) server;

receiving signaling indicating an address of an edge DNS server;

intercepting a DNS request from an application;

changing a destination address of the DNS request to the address of the edge DNS server;

intercepting a DNS response from the edge DNS server that is sent in response to the DNS request; and upon determining that the DNS response does not comprise a failure notification, changing a source address of the DNS response to the address of the DNS server.

23. The computer readable medium of claim 22, the operations further comprising upon determining that the DNS response comprises a failure notification, re-sending the DNS request to the address of the DNS server.

24. The computer readable medium of claim 22, the operations further comprising upon determining that the DNS response comprises a failure notification, re-sending the DNS request to an address indicated in the DNS response.

25. The computer readable medium of claim 22, wherein the signaling indicating the address of the DNS server is received in response to a protocol data unit (PDU) session establishment request.

26. The computer readable medium of claim 22, wherein the DNS response comprises a resolved internet protocol (IP) address for a domain name specified in the DNS request.

27. The computer readable medium of claim 22, the operations further comprising establishing a filter on a data path in order to intercept DNS requests and DNS responses.

28. The computer readable medium of claim 22, the operations further comprising requesting content from a content server indicated in the DNS response.

\* \* \* \* \*